March 27, 1934.  G. B. NELSON  1,952,883
COMBINED SHOVELING AND GRAIN DUMPING BOARD
Filed April 2, 1931  4 Sheets-Sheet 1
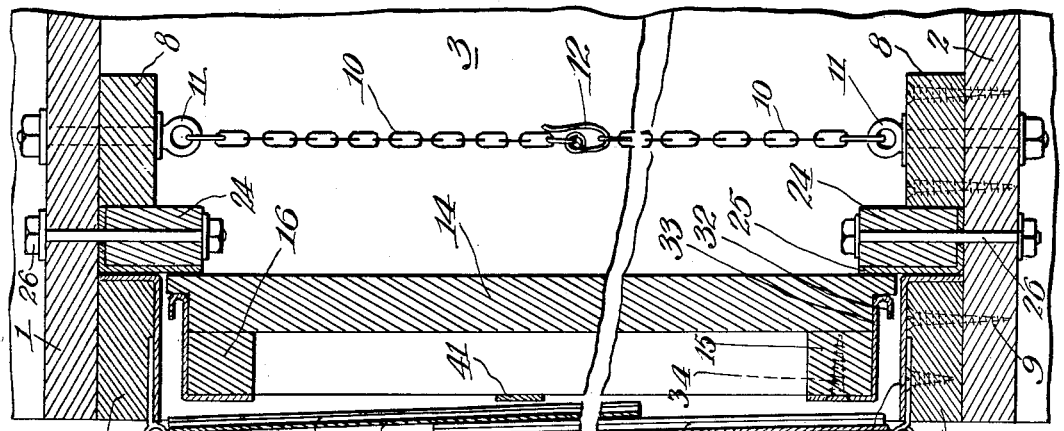
Inventor
George B. Nelson
By Wallace R Lane
Atty.

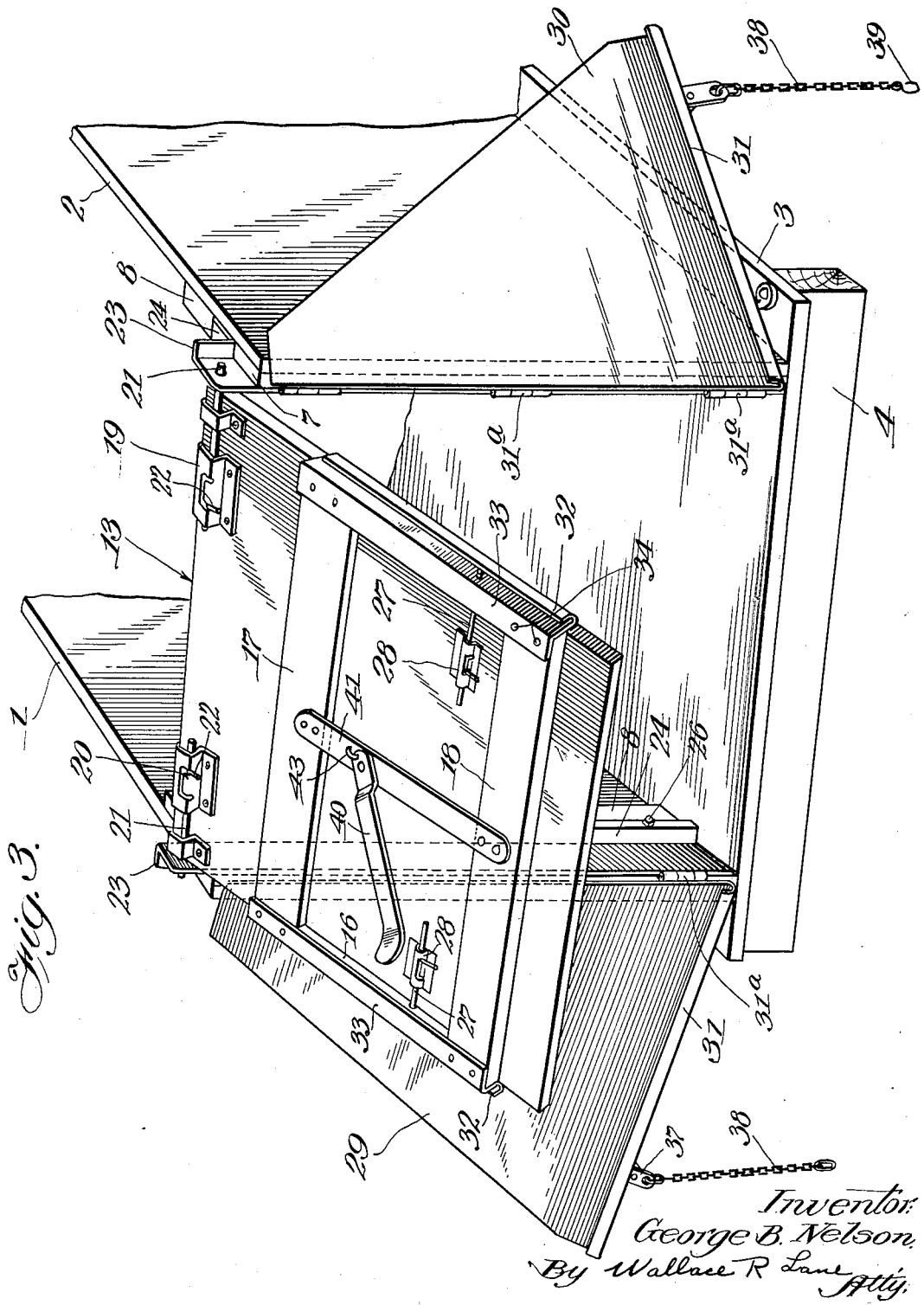

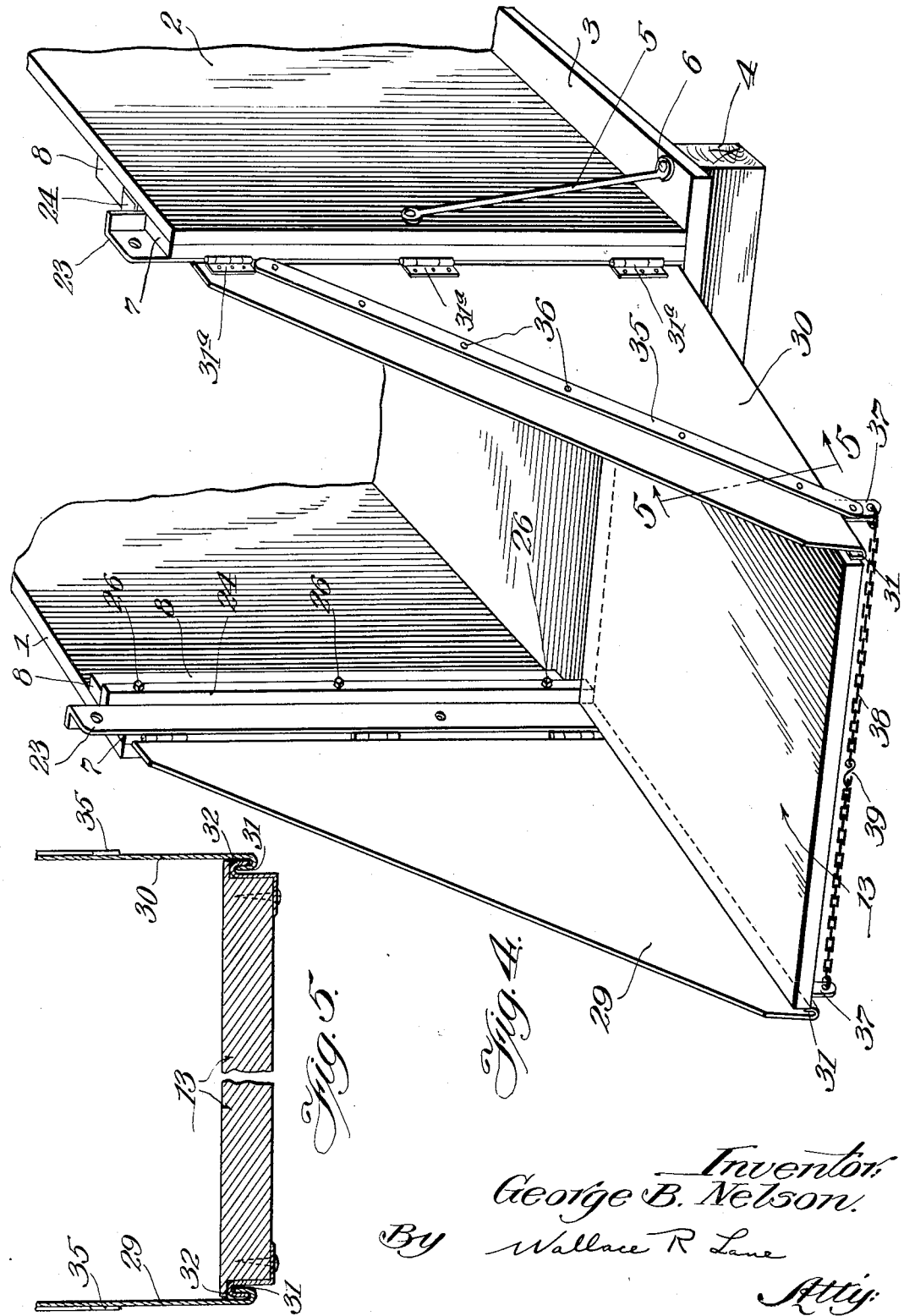

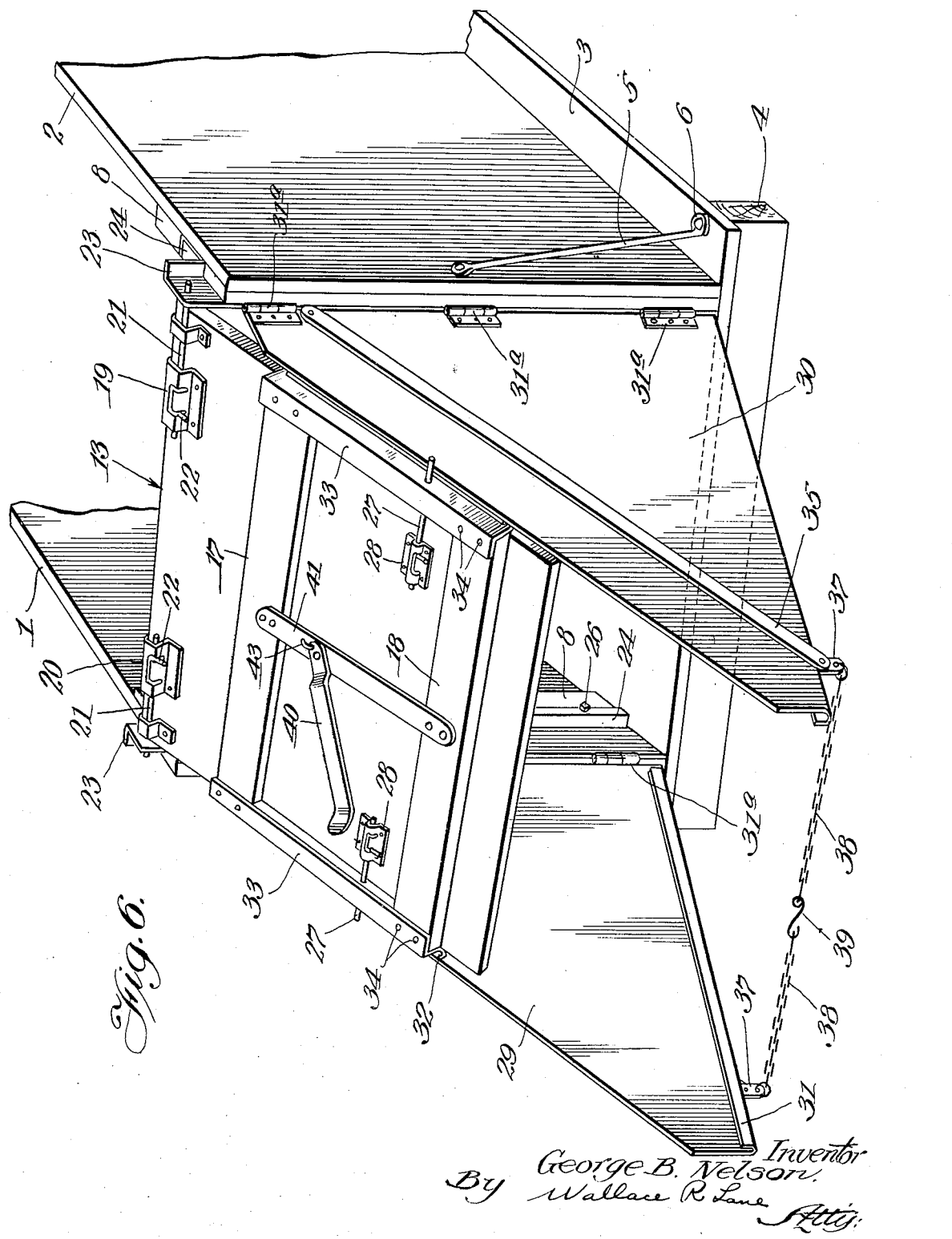

Patented Mar. 27, 1934

1,952,883

UNITED STATES PATENT OFFICE 1,952,883

COMBINED SHOVELING AND GRAIN DUMPING BOARD

George B. Nelson, Redfield, Iowa

Application April 2, 1931, Serial No. 527,156

7 Claims. (Cl. 296—51)

The present invention relates to combined shoveling and grain dumping boards for vehicle bodies, boxes or the like.

Among the objects of the present invention is to provide an end gate construction for a vehicle body, box or the like, adapted to be adjusted so as to be used not only for retaining material in the vehicle body or box, but likewise as a dumping or shoveling board when loading or unloading the body or box.

The invention comprehends the idea of providing an end gate structure which may be easily and readily applied to an ordinary vehicle body, box or the like, which may have been equipped with the ordinary end or tail-board.

Another object of the invention is to provide an end gate construction for vehicle bodies, boxes or the like adapted to provide a tight structure for effectively retaining bulk materials, such as grains and the like, and when unlocked to be adapted for instantaneous use as a dumping board.

A further object of the invention is to provide an adjustable end gate construction adapted to be used as a dumping board or end gate and which may be readily moved into a position for use as a shoveling board for either loading or unloading the vehicle body, box or the like.

The invention further contemplates the idea of providing an adjustable end gate construction for vehicle bodies, boxes and the like adapted to be used as a dumping board, as likewise as a shoveling board and when so used to be supported by supplemental side gates adapted to be swung into position for such use and to support loads applied to the end gate member.

A further object of the present invention is to provide an adjustable end gate construction in which these supplemental side gate members are adapted to be swung into an overlapping position adjacent the main gate for reinforcing the same, means being further provided on the main gate for holding these supplemental gates in this position and to provide a compact and neatly arranged structure.

A still further object of the invention is to provide an adjustable end gate construction for vehicle bodies, boxes and the like, in which the main gate is normally pivotally mounted for use as a dumping board, but adapted to be moved or lowered into a position to be used as a shoveling board. In the embodiment selected to illustrate the invention, means is provided on the main gate and is adapted to interengage with means on the supplemental side gates for supporting and holding the main gate in a shoveling board position. Means is further provided for holding these sides gates against swinging movement when the same are in a position for support of said main gate.

Other objects, features, capabilities and advantages are comprehended by the invention as will later appear and as are inherently possessed thereby.

Referring to the drawings:

Fig. 1 is a fragmentary view in perspective of a vehicle body or box having an embodiment of the present invention attached thereto.

Fig. 2 is a fragmentary view in horizontal cross section of the vehicle body shown in Fig. 1 of the drawings and disclosing in detail the construction of the embodiment of the present invention attached thereto.

Fig. 3 is a fragmentary view in perspective of the vehicle body of Fig. 1 of the drawings and disclosing the embodiment of the present invention in an open position as used for a dumping board.

Fig. 4 is a fragmentary view in perspective of the vehicle body and disclosing the embodiment of the present invention in an open position as used for a shoveling board.

Fig. 5 is a broken view in cross section taken in a plane represented by the line 5—5 of Fig. 4 of the drawings.

Fig. 6 is a fragmentary view in perspective of the vehicle body and discloses the main gate of the embodiment of the present invention as used for a dumping board, the same being supported on the side gates.

Referring now more in detail to the drawings, an embodiment of the present invention is shown in association with a vehicle body or box having the sides 1 and 2 and a bottom or flooring 3 connected to these sides by any suitable means, this floor or bottom 3 being supported upon transverse members, such as the beam 4 or the like. These side members of the vehicle body or box are braced and held against outward movement by the brace members 5 connected as by means of bolts, screws, or the like 6, to the flooring 3 and the sides.

This vehicle body or box is of the ordinary construction and is usually provided at the rear end thereof with upright members 7 and 8 spaced apart and adapted to provide shoulders for the reception of the ordinary end gate or tail board for retaining the material in the vehicle body or the like. If, the vehicle body or box is not provided with such upright members, these members may be provided in the present construction and are secured to the sides of the body or box by means of screws 9 or the like. In order to prevent outward movement of the box sides, a chain 10 is provided and has its ends secured in the eyes of eye-bolts 11 passing through the upright members 8 and being connected to the sides 1 and 2 of the vehicle body or box.

The chain 10 is formed in two parts and is connected together by a link or catch 12 adapted to draw the sides 1 and 2 together and to take up any slack in the chain member.

The present gate construction includes a main gate 13 of frame like construction comprising a rear backing member or members 14, upright side cleats 15 and 16 and top and bottom cleats 17 and 18 secured to the backing member or members 14 to provide a rigid construction. This main gate 13 is provided with latch members 19 and 20 secured adjacent the upper edge thereof and provided with latch bolts 21 operated by handle 22, and pivoted in openings in metal plates 23 covering the inside faces of the upright members 7 and secured thereto and projecting above the upper edge of the sides 1 and 2 and the upper end of the upright members 7. This main gate 13 is normally adapted to swing about the latch bolts 21 and when in a closed position is adapted to be in contacting engagement with stop members 24 having certain of their faces covered by a metal plate 25, these stop members being secured by means of bolts 26 to the sides 1 and 2 of the vehicle body or box and between the upright cleats or members 7 and 8.

As more clearly shown in Figs. 3 and 6 of the drawings, this main end gate is adapted to swing outwardly about the latch bolt 21 as a pivot point whereby the same is adapted to be used as a dumping board. When this main gate is in its closed position and in contacting engagement with the stop members 24, the latch bolts 27 of latch mechanisms 28 secured to both sides of the gate are adapted to engage with keepers in the upright members 7 for locking this main gate in this closed position for effectively retaining materials within the vehicle body or box.

In order that the main gate 13 may be used as a shoveling board, supplemental side gears 29 and 30 are provided and are swingably mounted as by means of the hinge members 31ª to the upright members 7. These supplemental side gates 29 and 30 are adapted to be swung outwardly into the position as shown in Fig. 3 of the drawings when it is desired to use the main gate 13 as a dumping board, or to be swung into an overlapping position as disclosed in Fig. 1 of the drawings when the main gate is in a closed position for the purpose of reinforcing this main gate and to provide a compact and neat construction. If it is desired to prevent inward movement of the main gate toward the body of the vehicle when the same is used as a dumping board, the side gates may be connected together and held against outward swinging movement by the chain 38. The main gate may then be swung rearwardly about the latch bolts 21 into a position where the latch bolts 27 will engage with the upper edge of the side gates. When the main gate is in this position, latch bolts 27 may be moved, so as to engage these side gates, as clearly shown in Fig. 6 of the drawings. These supplemental gates are preferably made from sheet metal or the like and have their lower edge rolled to provide an upstanding flanged portion 31 adapted to engage with the flanges 32 of sheet metal pieces 33, secured to the side cleats 15 and 16 of the main gate 13, by means of screws 34 or the like.

When it is desired to use the main gate 13 as a shoveling board, the same is detached from the upright members 7 and 23 and lowered or moved into the position as clearly shown in Fig. 4 of the drawings. The side gates 29 and 30 are swung into the position as shown in this figure of the drawings, at which time the flange portions 31 and 32 of the side gates and main gate respectively, engage. The main gate 13 is then supported by the side gates in a position to be used as a shoveling board for loading or unloading material into or out of the vehicle body or box. The lower edge of the main gate when the same is in a shoveling board position, is in abutting relation with the stop members 24 for holding this main gate and to prevent inward movement thereof.

Each of the supplemental side gates 29 and 30 are provided with a strap member 35 secured thereto by means of rivets 36 or the like, adjacent the upper edge thereof for reinforcing and strengthening these sides. Each of these straps project beyond the lower edge of the supplemental gates at their forward edge or end and have a lug or ear 37 secured thereto. To each of these lugs 37 is attached a section of a chain 38 adapted to be connected together by a catch or link 39 for drawing the side gates 29 and 30 inwardly toward one another to prevent swinging movement of the same outwardly when the main gate 13 is supported thereby and in a position to be used as a shoveling board. It will be observed that the lower edge of these supplemental side gates slope upwardly away from the vehicle body or box in an outwardly direction so as to provide a sloping support for the main gate 13 when the same is used as a shoveling board to prevent loss of material from the vehicle body of box when the same is in this position.

When the main gate 13 is used as an end gate for the vehicle body or box, as clearly shown in Fig. 1 of the drawings, the supplemental side gates 29 and 30 are swung into an overlapping position as shown in this figure. When the same are in this position, these gates are held by means of a latch member 40 pivoted to a strap 41 spanning between the cleats 17 and 18 and secured thereto by means of screws 42 or the like. The latch member 40 is provided at its upper end with a hook 43 adapted to support the ends of the sections of the chain 39 and to prevent their dragging or hanging from the lugs 37.

From the above disclosure, it will be quite apparent that the main gate 13 may be easily and readily moved or lowered from the position shown in Figure 1 of the drawings into the position shown in Figure 4 of the drawings whereby the same may be used as a shoveling board. When this main gate is pivoted at its upper edge, the same may be used as a dumping board by merely retracting the latch bolts 27 from their keepers so as to permit the rearward swinging thereof as clearly shown in Fig. 3 of the drawings, or the same may be swung rearwardly and supported in place by means of the latch bolts 27, as shown in Fig. 6 of the drawings.

While I have herein described and upon the drawings shown an illustrative embodiment of the invention, it is to be understood that the invention is not limited thereto, but may comprehend other constructions, arrangements of parts, details and features without departing from the spirit of the invention.

Having thus disclosed the invention, I claim:

1. The combination of a wagon body or box, a main end gate detachably carried thereby, said gate being adapted to be pivotally connected to said body for swinging movement to a position out of the way of the load whereby to dump the contents of said body, supplemental side gates swingably connected to said body, said main gate also adapted to be positioned below said side gates so as to be used as a shoveling board, and means for supporting said main gate on said side gates when used as a shoveling board or dumping board.

2. The combination of a wagon body or box, a main end gate detachably carried thereby, said gate being adapted to be pivotally connected to said body for swinging movement to a position out of the way of the load whereby to dump the contents of said body, supplemental side gates swingably connected to said body, said main gate being adapted to be lowered between said side gates so as to be used as a shoveling board, said side gates having means for supporting said main gate, means to support said main gate on said side gates when used as a dumping board, stop means for said main gate, and means for holding said side gates against swinging movement.

3. In an adjustable vehicle body end gate, the combination of upright posts secured to said body, stop members between said posts, a pivotally mounted upwardly swinging main gate normally in contacting engagement with said members, means for locking said gate in said position for retaining material in said body, supplemental side gates swingably connected to said body, said main gate being adapted to be lowered into a position to be used as a shoveling board, and means for supporting said main gate on said side gates, said main gate being adapted to abut said stop members when said gate is in its lowered position.

4. In an adjustable vehicle body end gate, the combination of upright posts secured to said body, stop members between said posts, metal plate members secured to certain of said posts and extending above said body, a main gate pivotally mounted in said plate members for upwardly swinging movement and normally in contacting engagement with said stop members, means for locking said gate in said position for retaining material in said body, supplemental side gates swingably connected to said body, said main gate being adapted to be lowered into a position to be used as a shoveling board, and means for supporting said main gate on said side gates, said main gate being adapted to abut said stop members when said gate is in its lowered position.

5. In an adjustable vehicle body end gate, the combination of upright posts secured to said body, stop members between said posts, a pivotally mounted upwardly swinging main gate normally in contacting engagement with said members, means for locking said gate in said position for retaining material in said body, supplemental side gates swingably connected to said body adapted to be moved into overlapping position adjacent said main gate, means on said main gate for holding said side gates in said position to reinforce said main gate, said main gate being adapted to be lowered into a position to be used as a shoveling board, and means for supporting said main gate on said side gates when in said lowered position, said main gate adapted to abut with said stop members when in said lowered position.

6. In an adjsutable vehicle body end gate, the combination of upright posts secured to said body, stop members between said posts, metal plate members secured to certain of said posts and extending above said body, a main gate pivotally mounted in said plate members for upwardly swinging movement and normally in contacting engagement with said stop members, means for locking said gate in said position for retaining material in said body, supplemental side gates swingably connected to said body adapted to be moved into overlapping position adjacent said main gate, means on said main gate for holding said side gates in said position to reinforce said main gate, said main gate being adapted to be lowered into a position to be used as a shoveling board, and means for supporting said main gate on said side gates when in said lowered position, said main gate adapted to abut with said stop members when in said lowered position.

7. A vehicle body end gate comprising a main gate, supplemental side gates swingably connected to said body, said main gate adapted to be pivotally connected at the top thereof to said body whereby to dump the contents of said body, and adapted to be moved into a position to be used as a shoveling board, means to support said main gate on said side gates when in the former position and means to support said main gate on said side gates when in the latter position.

GEORGE B. NELSON.